United States Patent [19]
Renaut et al.

[11] Patent Number: 5,788,562
[45] Date of Patent: Aug. 4, 1998

[54] PROCESS FOR PREPARING TO OPEN BIVALVES, PARTICULARLY OYSTERS, AND DEVICE FOR PERFORMING IT

[76] Inventors: Yves Renaut, 2, place Sévigné, 35510 Cesson Sevigne; Michel Delvigne, 26, rue Nicolas Appert, 85300 Challans, both of France

[21] Appl. No.: 875,448

[22] PCT Filed: Jan. 26, 1996

[86] PCT No.: PCT/FR96/00140

§ 371 Date: Aug. 14, 1997

§ 102(e) Date: Aug. 14, 1997

[87] PCT Pub. No.: WO96/00140

PCT Pub. Date: Jan. 26, 1996

[30] Foreign Application Priority Data

Jan. 27, 1995 [FR] France ................... 95 01191

[51] Int. Cl.$^6$ ................................................. A22C 29/04
[52] U.S. Cl. ................................................. 452/13; 452/6
[58] Field of Search ................... 452/13, 12, 17, 452/4, 64, 6

[56] References Cited

U.S. PATENT DOCUMENTS

| 5,145,448 | 9/1992 | Ebisuzaki | 452/13 |
| 5,197,918 | 3/1993 | Klaassen | 452/135 |
| 5,405,290 | 4/1995 | Chuang | 452/136 |

FOREIGN PATENT DOCUMENTS

| 49725 | 1/1935 | Denmark | 452/6 |
| 2150416 | 7/1985 | United Kingdom | 452/136 |

*Primary Examiner*—Willis Little
*Attorney, Agent, or Firm*—Young & Thompson

[57] ABSTRACT

A process and device for preparing bivalves, in particular oysters, for opening. The process consists of partially opening the bivalve, then encircling the adductor muscle of the bivalve with a ring or similar, one part of which, designed for gripping, remains outside the bivalve valve, so that, when the bivalve is subsequently closed, the adductor muscle can be severed by pulling on the aforesaid gripping element. The device comprises a wire (1) shaped as a loop (12) to which a gripping element (2) is linked, to be inserted into the loop (12) after the latter has been placed around the adductor muscle (3) of the bivalve.

10 Claims, 2 Drawing Sheets

PROCESS FOR PREPARING TO OPEN BIVALVES, PARTICULARLY OYSTERS, AND DEVICE FOR PERFORMING IT

FIELD OF THE INVENTION

The present invention has for its object a process for preparing to open bivalves, particularly oysters, and the device permitting performing it.

BACKGROUND OF THE INVENTION

Opening oysters and other bivalves is conventionally carried out by means of an oyster knife which can be electrical or not.

In practice, the knife is introduced forcibly between the two valves so as partially to open the shell and to cut the adductor muscle, which requires skill and physical force, and is often the cause of accidents, such that the difficulty of opening oysters and other bivalves constitutes a substantial obstacle to the increase in their consumption.

There has also been proposed (JP-A-1.291.744) cutting the adductor muscle by means of a cutting tool and gripping the two shells by suitable means so that the oyster remains closed. This known process has the same drawback as the preceding one.

There has also been proposed (JP-1.291.744) cutting the adductor muscle by means of a cutting tool and gripping the two shells by suitable means so that the oyster remains closed. This known process has the same drawback as the preceding one.

SUMMARY OF THE INVENTION

The present invention has for its object to overcome this drawback by providing a process for preparing to open oysters and other bivalves, permitting easy and risk-free opening, requiring no particular skill.

The process of the present invention consists in partially opening the bivalve in the course of its culture, and then encircling the adductor muscle by means of a ring or the like, prolonged by gripping means which remain outside the bivalve, so as to permit eventually, even though the bivalve is closed, cutting the adductor muscle by pulling on said gripping means.

According to the invention, opening the bivalve to permit encircling the adductor muscle is carried out by immersing the bivalve in a solution of about 40% fresh water and 60% seawater, with the addition of about 5% by weight of magnesium chloride.

In practice, bivalves are immersed, after washing and sizing, in such a solution, the immersion time being preferably of the order of six hours.

The magnesium chloride causes a relaxation of the adductor muscle which permits partially opening the bivalve so as to carry out the encircling.

The encircling of the adductor muscle may be carried out outside the solution, after immersion, or preferably in the latter.

After the encircling operation, the bivalves are immersed in seawater so as to eliminate naturally the magnesium chloride, which takes place rapidly.

The device for practicing the process according to the invention comprises, according to a first embodiment, a metallic wire shaped in a loop to which is secured gripping means adapted to be introduced into said loop after the latter has passed about the adductor muscle of the bivalve, the filament passing twice about the adductor muscle whilst the gripping means remains outside the bivalve.

To open the bivalve at the time of its consumption, it suffices to pull on the gripping means, which has the effect of tightening the encircling member about the adductor muscle and cutting this latter.

According to a second embodiment, the device permitting the practice of the process according to the invention comprises a flat blade in the arc of a circle whose concave edge is sharpened, and whose ends are each introduced, with the possibility of securement, into one of the ends of a rigid sleeve in the form of a segment of a torus, so as to form a ring adapted to be placed about the adductor muscle whilst retracting said blade in said sleeve, said cutting edge being covered by a removable envelope connected to a filament passing through said sleeve and leaving by an opening provided in the latter in its region diametrically opposed to the blade, a pull on said filament permitting removing said envelope for cutting said adductor muscle by the blade.

The advantages and characteristics of the present invention will become more apparent from the description which follows and which relates to the accompanying drawing, in which are shown two non-limiting embodiments.

DETAILED DESCRIPTION OF THE DRAWINGS

Figure 1:
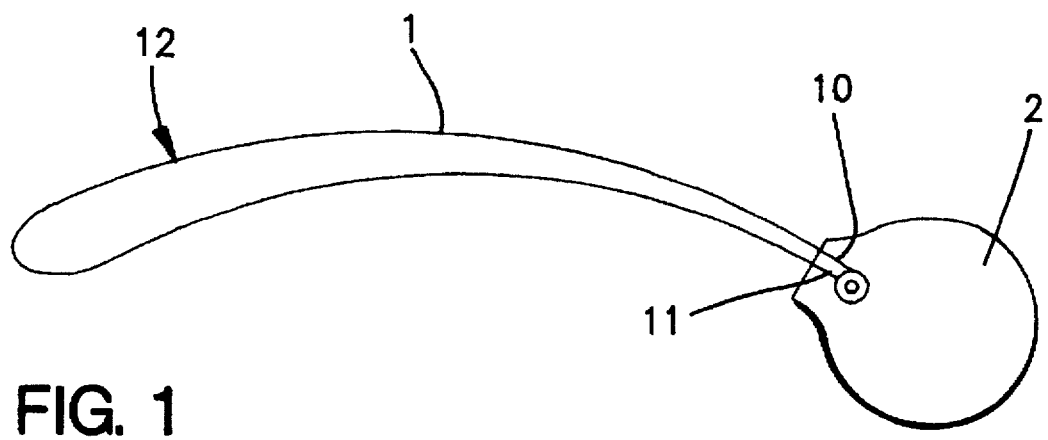
FIG. 1 is a plan view of a first embodiment of the device according to the invention.

Referring to FIG. 1, it can be seen that in a first embodiment, the device according to the invention comprises a filament 1 whose ends 10 and 11 are secured to gripping means 2 so as to form a loop 12.

The filament 1 is preferably of stainless steel and of small section, and the gripping means 2 is a small plate made of plastic material of the type of polyvinylchloride.

Figure 2:
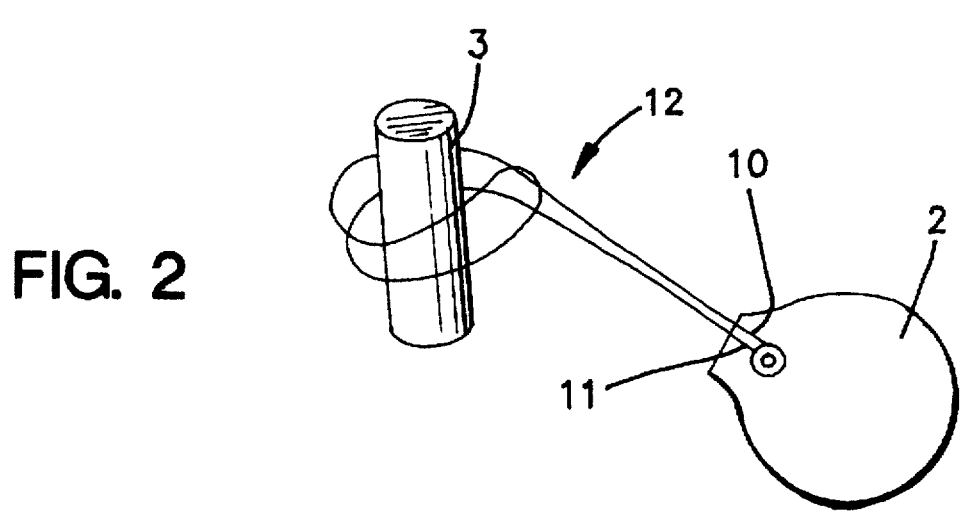
FIG. 2 is a partial view in perspective of the same device in place.

Referring now to FIG. 2, there can be seen the encircled adductor muscle 3 of a bivalve, which is obtained by passing the loop 12 between the hinge (not shown) and the adductor muscle 3 and passing the gripping means 2 through the loop 12.

It should be noted that, according to a modification (not shown), the device according to the invention could be formed of a filament whose two ends are adapted to be secured to each other after which one of them is passed about the adductor muscle.

Figure 3:
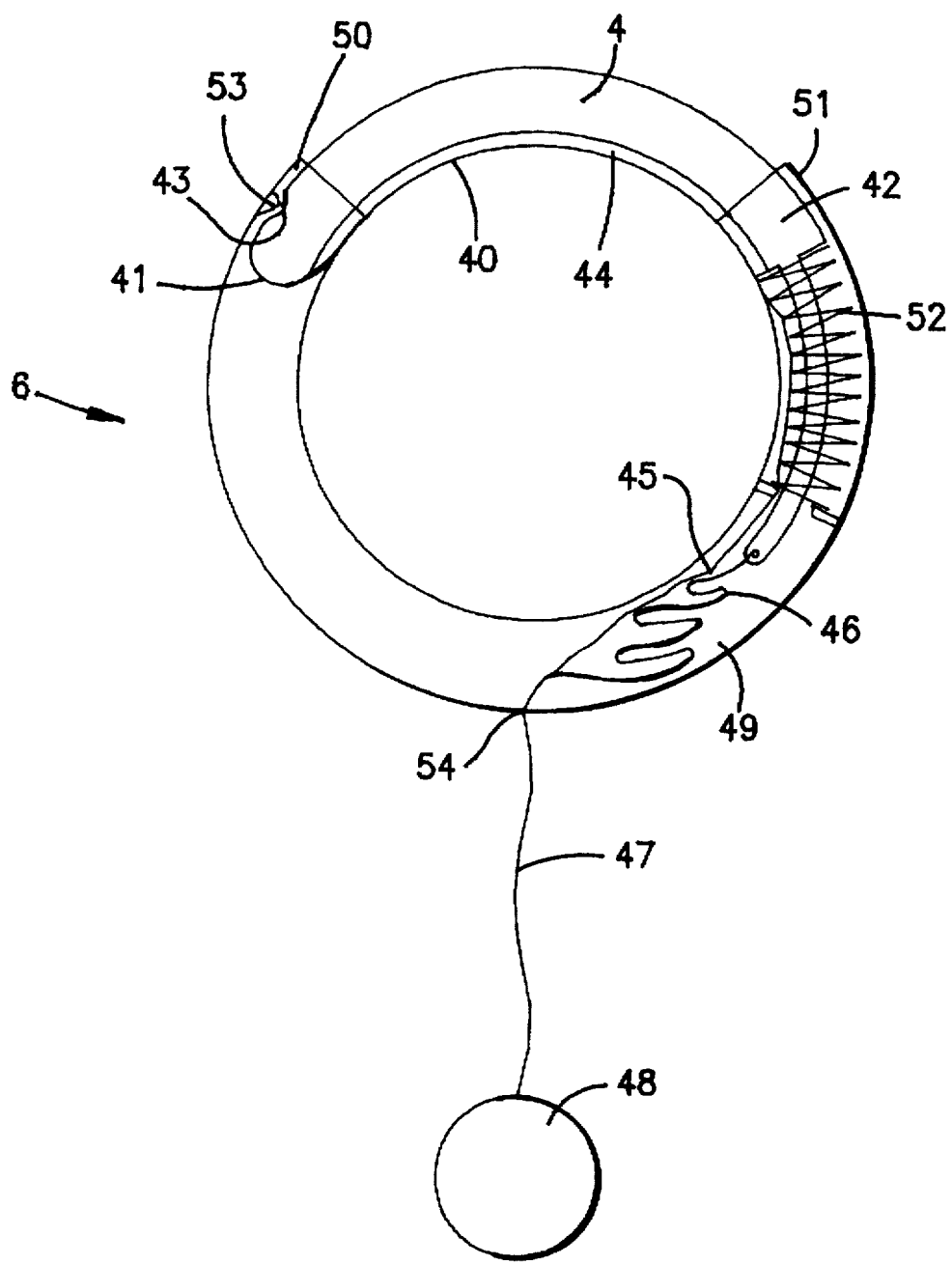
FIG. 3 is a plan view of a second embodiment of the device according to the invention.

Referring now to FIG. 3, it can be seen that in a second embodiment, the device according to the invention comprises a flat blade 4 in the arc of a circle whose concave edge 40 is sharpened, and whose ends 41 and 42 are introduced each into the ends, respectively 50 and 51, of a rigid arcuate sleeve 5.

The sleeve 5 and the blade 4 form a ring 6 adapted to encircle the adductor muscle, its positioning being carried out by retracting the blade 4 into the sleeve 5.

The retraction of the blade 4 into the sleeve 5 is carried out manually by compressing a spring 52 contained in the sleeve 5 and on which bears the end 42 of the blade 4.

The closing of the ring 6 is secured by a notch 43 provided in the end 41 of the blade 4 and into which clicks a lug 53 which comprises internally the end 50 of the sleeve 5.

The cutting edge 40 of the blade 4 is covered with an envelope 44 connected to a filament 45, whilst the blade 4 is connected to a filament 46, the filament 45 and the filament 46 being secured, by their free ends, to a filament 47 which passes through the sleeve 5 and which leaves the sleeve by an opening 54 provided in the latter in its region diametrically opposed to the blade 4, the free end of the filament 47 comprising gripping means 48.

Pulling on the filament 47, whilst grasping the gripping means 48 which remains outside the bivalve, has for its first result to remove the envelope 44, and as its second result to drive the ring 6, which results in cutting the adductor muscle by the sharp edge 40.

It is to be noted that the filament 46 comprises, within the sleeve 5, a slack length 49, permitting avoiding the driving of the ring 6 until after removal of the envelope 44.

We claim:

1. Process for preparing to open bivalves, particularly oysters, characterized in that it consists in partially opening the bivalve in the course of its culture, then encircling the adductor muscle by means of a ring or the like, prolonged by a gripping means which remains outside the bivalve, so as to permit ultimately, when the bivalve is closed, cutting the adductor muscle by pulling on said gripping means.

2. Process according to claim 1, characterized in that the opening of the bivalve to permit encircling the adductor muscle, is obtained by immersing the bivalve in a solution of about 40% fresh water and 60% seawater, with the addition of about 5% by weight of magnesium chloride.

3. Process according to claim 2, characterized in that the duration of the immersion operation is of the order of 6 hours.

4. Process according to claim 2 characterized in that the encircling is performed outside the immersion solution.

5. Process according to claim 2 characterized in that the encircling is performed in the immersion solution.

6. process according to claim 2, characterized in that the encircling is followed by an operation of prolonged immersion in seawater.

7. Device for preparing to open bivalves, particularly oysters, comprising filament (1) in the form a loop (12); gripping means (2) secured to said filament and adapted to be introduced into said loop (12) after the loop has been passed about the adductor muscle (3) of the bivalve for cutting said adductor muscle when the gripping means is pulled.

8. Device for practicing the process according to claim 7, wherein the filament is introduced between the hinge and the adductor muscle of the bivalve and the gripping means secures the two ends of the filament to each other outside the bivalve.

9. Device according to claim 7, characterized in that the filament is of stainless steel.

10. Device for preparing to open bivalves, particularly oysters, comprising: an arcuate flat blade (4) having a sharpened concave edge (40), and opposed ends (41, 42), a rigid sleeve (5) in the form of a toric segment wherein said blade ends are each introduced, respectively, into one of the ends (50, 51) of said rigid sleeve (5) so as to form a ring (6) to be disposed about the adductor muscle by retracting said blade (4) into said sleeve (5); said sharpened edge (40) being covered with a removable envelope (44) connected to a filament (47) passing through said sleeve (5) and leaving via an opening (54) provided in said sleeve in its region diametrically opposed to the blade (4), a pull on said filament (47) permitting removal of said envelope (44) for cutting said adductor muscle.

\* \* \* \* \*